United States Patent [19]
Gable et al.

[11] 4,442,708
[45] Apr. 17, 1984

[54] AUTOMATIC DRIVER SYSTEM

[75] Inventors: Stewart V. Gable, Ypsilanti; Francis G. King, Birmingham, both of Mich.

[73] Assignee: Ford Motor Company, Dearborn, Mich.

[21] Appl. No.: 421,556

[22] Filed: Sep. 22, 1982

[51] Int. Cl.³ .......................................... G01M 15/00
[52] U.S. Cl. .................................... 73/117; 73/862.18
[58] Field of Search ............... 73/117, 862.18, 862.13, 73/862.16, 116

[56] References Cited

U.S. PATENT DOCUMENTS

| | | | |
|---|---|---|---|
| 3,333,463 | 8/1967 | Hollinghurst | 73/117 |
| 3,712,126 | 1/1973 | Campbell | 73/117 |
| 3,713,332 | 1/1973 | Herrbrich | 73/117 |
| 3,926,043 | 12/1975 | Marshall | 73/117 |
| 4,121,452 | 10/1978 | Wakabayashi et al. | 73/117.3 |
| 4,370,883 | 2/1983 | Coetsier | 73/117 |
| 4,381,748 | 5/1983 | Eckert | 73/116 X |

FOREIGN PATENT DOCUMENTS 54-12008  1/1979  Japan .................. 73/862.18

Primary Examiner—S. Clement Swisher
Assistant Examiner—Ellwood G. Harding, Jr.
Attorney, Agent, or Firm—Peter Abolins; Robert D. Sanborn

[57] ABSTRACT

An automatic driving system for operating a vehicle on traction rollers of a chassis dynamometer includes an accelerator pedal actuator for moving the accelerator pedal. A sensing means senses vehicle speed, accelerator pedal position and accelerator pedal actuator velocity. Accelerator pedal control means drives the accelerator pedal actuator and is coupled to the sensing means for generating a triple loop accelerator pedal control signal using vehicle speed, accelerator pedal position and actuator motor velocity feedback to reduce throttle fluctuations.

6 Claims, 2 Drawing Figures

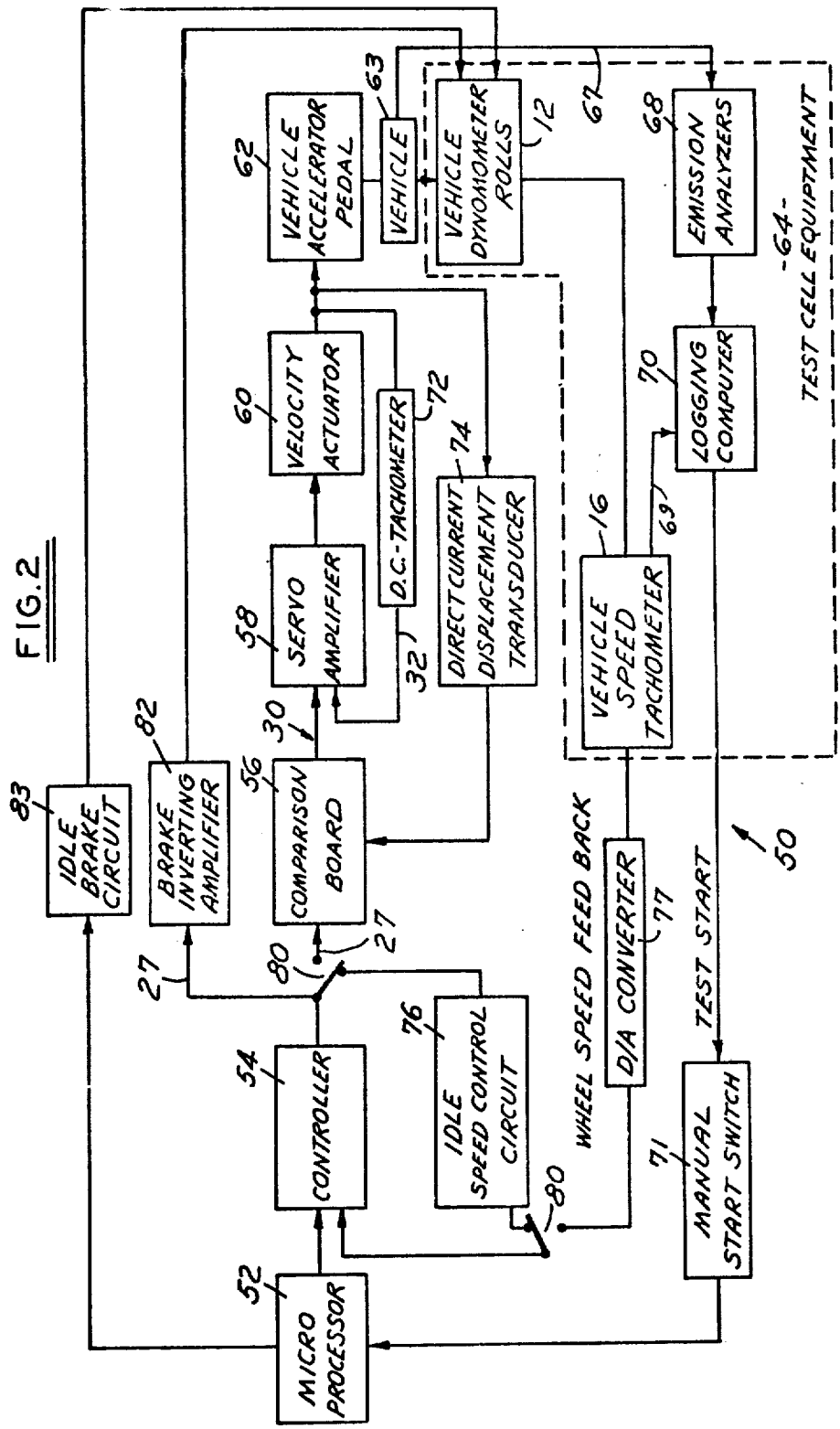

AUTOMATIC DRIVER SYSTEM

This application is related to commonly assigned applications U.S. Ser. No. 421,640 filed Sept. 22, 1982, entitled "Automated Automotive Control Actuator" by F. G. King et al. and U.S. Ser. No. 421,559 filed Sept. 22, 1982 entitled "Automated Manual Transmission Shifter" by S. V. Gable et al.

BACKGROUND OF THE INVENTION

1. Field of the Invention

This invention relates to a method and apparatus for running an engine and associated powertrain in a motor vehicle in the same manner as a normal road operation, while maintaining the body of the vehicle stationary, for various testing purposes.

2. Prior Art

U.S. Pat. No. 4,121,452 issued to Wakabayashi et al discloses a microprocessor-based diagnostic testing system for periodic safety and emission testing of automobiles. U.S. Pat. No. 3,926,043 issued to Marshall et al discloses an automatic driver system for diagnostic testing wherein the throttle actuator 54 is moved in response to an output from a recorder 44. A position feedback is provided by means of a potentiometer 48. The dynamometer is also controlled by the system recorder 44 and includes a device 42 which contains an eddy current inductor which provides a retarding force on the ruler 34.

U.S. Pat. No. 3,333,463 to Hollinghurst discloses a dynamometer system wherein braking is applied by means of the dynamometer brake to correspond to the use of the actual vehicle brake. Hollinghurst also teaches a feedback control loop supplying information about vehicle speed and accelerator pedal position. However, there is not taught a triple loop control system including a feedback signal characterizing the speed of actuator movement. None of the background art teaches both an accelerator pedal position feedback signal and a servo motor speed feedback signal.

The patent to Campbell, U.S. Pat. No. 3,712,126 teaches a digital proportional and derivative control while the patent to Hollinghurst teaches an analog proportional control. However, no uncovered background art discloses the use of any analog controllers employing the three control modes of proportional, integral and derivative.

SUMMARY OF THE INVENTION

This invention teaches an automatic driving means using a combination of feedback information including vehicle speed, accelerator pedal actuator displacement and accelerator pedal actuator velocity. The automatic driving means operates a vehicle mounted on traction rollers of a chassis dynamometer.

The driving means includes an accelerator pedal actuator means for moving the vehicle accelerator pedal and a sensing means for sensing vehicle speed, accelerator pedal position and accelerator pedal actuator means velocity. An accelerator pedal control means drives the accelerator pedal actuator means and is coupled to the sensing means for generating a triple loop accelerator pedal control signal using vehicle speed, accelerator pedal position and actuator motor velocity feedbacks, so as to reduce throttle fluctuations.

Advantageously, the automatic driving means includes the use of existing friction loading capability of the electric dynamometer for braking. A control means activates the friction loading based on a vehicle speed feedback.

BRIEF DESCRIPTION OF THE DRAWINGS

FIG. 2 is a more detailed block diagram of portions of FIG. 1.

DETAILED DESCRIPTION OF THE INVENTION

Figure 1:
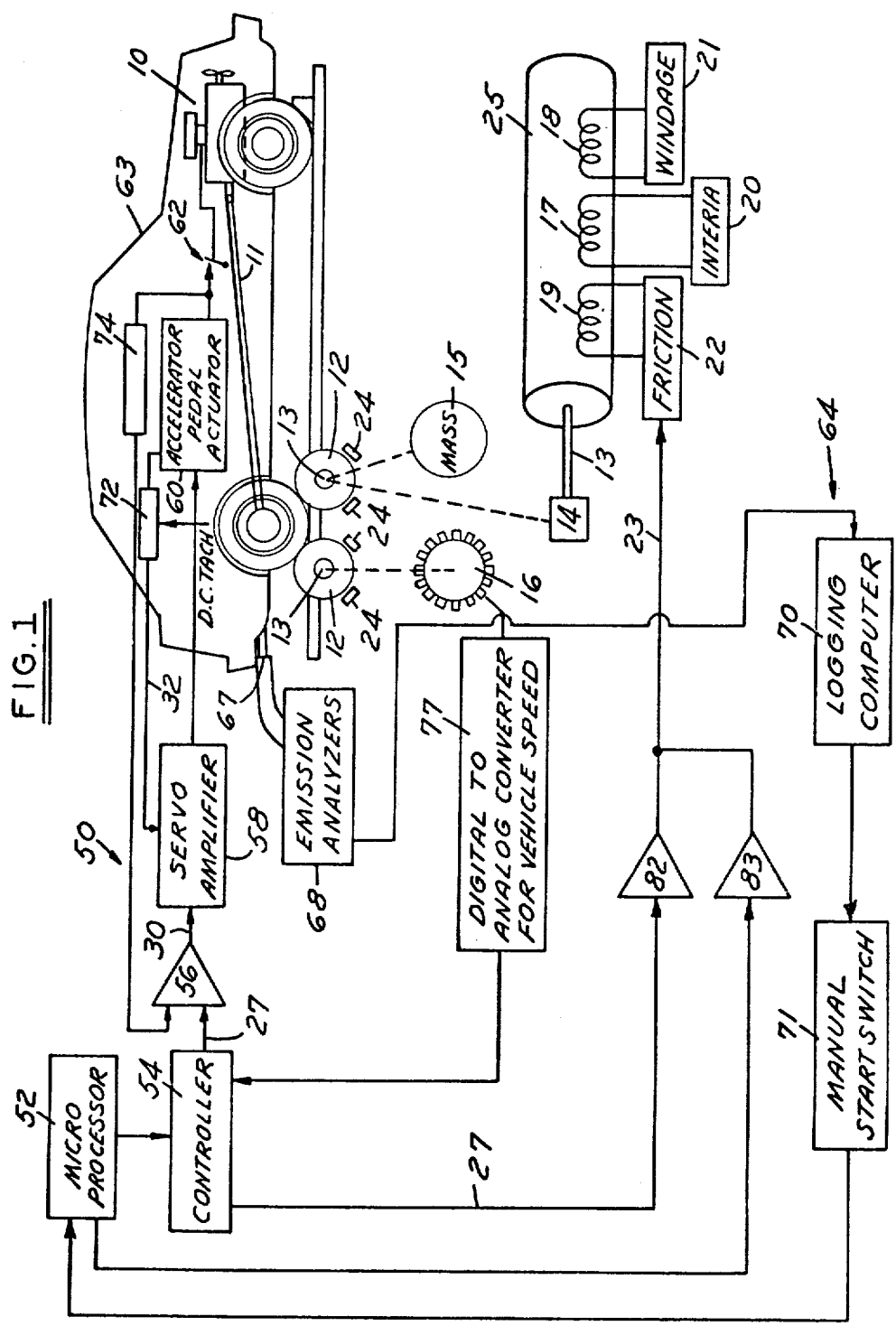
FIG. 1 is a block diagram of an automatic driver system in accordance with the embodiment of this invention.

Referring to FIGS. 1 and 2, an automatic driver system 50 for a vehicle 63 includes microprocessor 52 which is coupled to the vehicle's accelerator pedal 62 through the series connection of an analog controller 54, a comparison board 56, a servo amplifier 58, and an accelerator pedal or velocity actuator 60. These connections are all electrical with the exception of a mechanical connection between velocity actuator 60 and accelerator pedal 62. Vehicle 63 is positioned in test cell equipment 64 which includes vehicle dynamometer traction rollers 12, emmissions analyzers 68 and an emission cell logging computer 70. Emission analyzers 68 are coupled to the exhaust of vehicle 63 by a pipe connection 67.

Automatic drive system 50 includes three feedback loops for the control of accelerator pedal 62. First, a DC tachometer 72 is connected to velocity actuator 60 and provides an indication of actuator velocity to servo amplifier 58. Second, a direct current displacement transducer 74 is connected from the output of velocity actuator 60 to the input of comparison board 56 to provide the accelerator pedal position. Third, a vehicle speed feedback connection is coupled from vehicle dynamometer traction rollers 12 to the input of analog controller 54.

Referring to FIG. 1, engine 10 drives the road wheels of vehicle 63 through the usual powertrain, shown as a mechanical driveshaft 11, the road wheels being mounted in driving relationship on traction rollers 12. A main dynamometer shaft 13 rotates a selected flywheel weight 15 plus the weight of a dynamometer armature 25 to provide a portion of the inertia corresponding to that of vehicle 63. A tachometer 16 delivers a road speed signal according to the revolutions of shaft 13 which drives it. Shaft 13 is coupled by a connection 14 to a variable load established by a gradient load appliance through one or more direct current generators feeding a system load, shown as 17, 18, 19. The gradient effect, i.e., additional drag on shaft 13, is controlled with the aid of field excitation controls 20, 21 and 22. The inertia and windage loads provided by controls 20 and 21 are selected to correspond to the vehicle being tested. The gradient effect of these loads is a function of vehicle speed as given by tachometer 16.

Frictional load 19 is set at zero for most applications. The automatic driving means uses frictional load 19 for braking the vehicle. When the vehicle is being braked, the throttle signal is reduced to a minimum. The total torque needed to brake the vehicle is equal to the sum of engine friction, road drag, aerodynamic drag as well as the braking torque which is supplied by the frictional load instead of by the vehicle brakes.

Braking is controlled by analog controller 54 which reduces the difference between the actual vehicle speed and the desired vehicle speed. Actual speed is provided by a feedback loop, including tachometer 16, and desired speed is provided by the output of microprocessor 52. Such reduction of the difference is accomplished by combining proportional, derivative and integral functions of the magnitude of the difference. A negative voltage produced by controller 54 is applied to an inverter amplifier circuit 82 and then supplied through a line 23 to field excitation control 22 for increasing the frictional load of the chassis roll dynamometer for braking.

In operation of automatic driver system 50, after vehicle 63 has been secured to the test deck and accelerator pedal actuator 60 has been placed in vehicle 63 just touching accelerator pedal 62, motor vehicle engine 10 is started manually whereby automatic driver system 50 is activated either automatically through a signal from emission cell logging computer 70 or manually with a switch 71. That is, the detection of vehicle engine speed through a line 69 to logging computer 70 can be used to initiate operation of system 50.

Microprocessor 52 has a stored command schedule to which vehicle 63 is driven. The command schedule includes engine idle, acceleration, deceleration and braking. Initially, mechanical driveshaft 11 of vehicle 63 is not in the drive mode and automatic driver system 50 is set for idle condition. In idle condition, the throttle signal is at a minimum and a preset idle brake signal, commanded by microprocessor 52 through an idle brake circuit 83, is sent to frictional load excitation control 22 and pneumatic brake pads 24 are activated. With both the frictional load and pneumatic brake pads 24, sufficient braking is achieved to hold the wheel speed at zero even when the transmission of the powertrain is shifted to the drive position with a throttle actuated through cold idle choke settings.

An idle speed control circuit 76 (FIG. 2) provides a feedback loop around analog controller 54 when the vehicle is at idle to keep controller 54 cycling at its null point by using its output as its own feedback signal. Idle speed control circuit 76 is connected into automatic driver system 50 by a relay 80. Just before the vehicle accelerates from idle, microprocessor 52 operates relay 80 to disconnect idle speed control circuit 76 from analog controller 54 and to connect instead the vehicle speed feedback loop from vehicle dynamometer rollers 12. At the same time, relay 80 disconnects the output of analog controller 54 from the input of idle speed control circuit 76 and connects the output of analog controller 54 to the input of comparison board 56.

When an initial acceleration from idle is commanded by microprocessor 52, idle brake circuit 83 and pneumatic brake pads 24 are deactivated and system 50 enters into an accelerator pedal actuation and frictional load control mode. The accelerator pedal control functions under the three feedback loops.

First, vehicle speed, as sensed by an optical encoder 16, is fed back to controller 54 through a digital to analog converter 77. The vehicle speed is compared with an input from microprocessor 52 indicating desired vehicle speed. An error signal is generated on controller output line 27. The signal is negative when the vehicle is going too fast and is applied to brake inverting amplifier 82 thereby braking the vehicle. The signal is positive when the vehicle is going too slow and is applied to comparison board 56 thereby indicating a need to accelerate the vehicle. That is, the input to comparison board 56 from analog controller 54 is a voltage indicating the difference between the desired speed and the actual speed.

Second, the feedback signal from direct current displacement transducer 74, which is moved with pedal actuator 60, insures movement of accelerator pedal 62 in proportion to the magnitude of the error signal from controller output line 27 by processing both signals through a proportional comparison circuit 56.

Third, servo amplifier 58 receives a feedback signal indicating actuator motor speed on line 32 from DC tachometer 72. This enables pedal actuator 60 to travel at rate proportional to the servo amplifier 58 input signal on line 30.

The desired road speed varies with time and the three feedback loops permit system 50 to simulate driver behavior without chatter or hunting effects by bringing back accelerator pedal 62 after an initial opening but before desired speed is actually attained. Accordingly, microprocessor 52 includes an ability to simulate human driver anticipation when following a road schedule. The resultant speed schedule is the command schedule stored in microprocessor 52 and fed to controller 54 during the test. This command schedule together with the response of the system enables the actual speed to follow the desired road speed accurately without throttle fluctuations or unnecessary braking.

Comparison board 56 is calibrated internally to determine the correlation between the input voltage applied by controller 54 and the travel distance of accelerator pedal 62. This internal calibration is also applied to the feedback input from linear displacement transducer 74 to determine the magnitude of the signal to be applied to servo amplifier 58 from comparison board 56. Similarly, servo amplifier 58 is calibrated internally to relate volts to rate of actuator travel. The internal calibration of servo amplifier 58 is applied to the signal indicating accelerator pedal actuator speed supplied by tachometer 72 to servo amplifier 58.

Various modifications and variations will no doubt occur to those skilled in the various arts to which this invention pertains. For example, the apparatus for measuring vehicle speed may be varied from that disclosed herein. These and all other variations which basically rely on the teachings through which this disclosure has advanced the art are properly considered within the scope of this invention.

We claim:

1. An automatic driving means for operating a vehicle having an accelerator pedal for controlling the throttle, the vehicle being mounted on traction rollers of a chassis dynamometer, said automatic driving means including:
   accelerator pedal actuator means for moving the accelerator pedal;
   sensing means for sensing vehicle speed, accelerator pedal position and said accelerator pedal actuator means velocity; and
   accelerator pedal control means for driving said accelerator pedal actuator means and being coupled to said sensing means for generating a triple loop accelerator pedal control signal using vehicle speed, accelerator pedal position and pedal actuator motor velocity feedbacks, so as to reduce throttle fluctuations.

2. An automatic driving means as recited in claim 1 wherein said accelerator pedal control means includes:

a microprocessor means for storing a driving schedule and for providing the driving schedule to control said automatic driving means;

a controller means having an input coupled to the output of said microprocessor means;

a comparison board means coupled to said controller means having a first input coupled to the output of said controller means and a second input coupled to said sensing means for sensing accelerator pedal position, the output of said comparison board means being proportional to the difference between the two inputs to the comparison board means; and a servo amplifier means having an input coupled to the output of said comparison board means and an input coupled to said sensing means for sensing accelerator pedal actuator means velocity, said servo amplifier means having an output proportional to the difference between the two inputs to the servo amplifier means and being coupled to said accelerator pedal actuator means.

3. An automatic driving means as recited in claim 2 further comprising:

a brake inverting amplifier means coupled between the output of said controller means and the vehicle dynamometer traction rollers of the chassis dynamometer for generating a signal for controlling gradient load applications on the traction front roller to perform braking for the vehicle based on vehicle speed feedback.

4. An automatic driving means as recited in claim 3 further comprising:

an idle brake circuit means coupled between said microprocessor means and the vehicle dynamometer traction rollers for applying a load to the vehicle dynamometer traction rollers during idle to keep the vehicle wheels from turning at idle.

5. An automatic driving means as recited in claim 3 further comprising:

an idle speed control circuit means for providing a feedback loop around said controller means, said feedback loop being actuated when said automatic driving means is operating the vehicle at idle.

6. An automatic driving means as recited in claim 5 further comprising:

a relay coupling means for selectively coupling, at idle condition, the output of said controller means to the input of said idle speed control circuit means and the output of said idle speed circuit means to the input of said controller means, so that the output of said controller means is applied through a feedback path to the input of said controller means at idle conditions and said controller means cycles around its null point; and for selectively coupling at non-idle running conditions the output of said controller means to the input of said comparison board and the input of said controller means to said sensing means for vehicle speed, so that a different control configuration is used for idle and non-idle running conditions.

* * * * *